United States Patent
Prakash et al.

(10) Patent No.: US 9,065,678 B2
(45) Date of Patent: Jun. 23, 2015

(54) SYSTEM AND METHOD FOR PINNING VIRTUAL MACHINE ADAPTERS TO PHYSICAL ADAPTERS IN A NETWORK ENVIRONMENT

(71) Applicant: CISCO TECHNOLOGY, INC., San Jose, CA (US)

(72) Inventors: Gottuparthi Santha Satya Prakash, Karnataka (IN); Sudarshana Kandachar Sridhara Rao, Karnataka (IN); Vinay Kumar Goudru Chandrappa, Karnataka (IN); Ajit Sanzgiri, Los Gatos, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 223 days.

(21) Appl. No.: 13/659,614

(22) Filed: Oct. 24, 2012

(65) Prior Publication Data
US 2014/0112205 A1    Apr. 24, 2014

(51) Int. Cl.
*H04L 12/28* (2006.01)
*H04L 12/46* (2006.01)
*H04L 12/24* (2006.01)

(52) U.S. Cl.
CPC ............. *H04L 12/4625* (2013.01); *H04L 41/06* (2013.01)

(58) Field of Classification Search
CPC . H04L 12/44; H04L 12/4625; H04L 12/4641; H04L 49/70; H04L 63/0272; H04L 12/42; H04L 12/462; H04L 45/00; H04L 45/02; H04L 45/18; H04L 45/48; H04L 49/351; H04L 49/354; H04L 49/552

USPC .......................... 370/256, 400, 401, 402, 408
See application file for complete search history.

(56) References Cited

U.S. PATENT DOCUMENTS

| | | | |
|---|---|---|---|
| 8,325,629 B2* | 12/2012 | Tallet et al. .................. 370/256 |
| 2008/0162800 A1* | 7/2008 | Takashige et al. ............ 711/104 |
| 2009/0292858 A1* | 11/2009 | Lambeth et al. .................. 711/6 |
| 2012/0005521 A1* | 1/2012 | Droux et al. ................. 714/4.11 |
| 2014/0108584 A1* | 4/2014 | Lu ................................. 709/208 |

OTHER PUBLICATIONS

Contemporary Controls, "The ABCs of Spanning Tree Protocol" Info Sheet, Feb. 2006, 6 pages.

* cited by examiner

*Primary Examiner* — Ricky Ngo
*Assistant Examiner* — Wei-Po Kao
(74) *Attorney, Agent, or Firm* — Patent Capital Group

(57) ABSTRACT

A method for pinning virtual machine adapters to physical adapters in a network environment is provided and includes capturing a first Bridge Protocol Data Unit (BPDU) from a first switch in a virtual local area network (VLAN), and a second BPDU from a second switch in the VLAN, identifying a first root bridge identifier (ID) of a first spanning tree associated with the first BPDU and a second root bridge ID of a second spanning tree associated with the second BPDU, comparing the first root bridge ID and the second root bridge ID, and communicating an alert. If the first root bridge ID is different from the second root bridge ID, the alert indicates re-pinning a virtual network interface card associated with a virtual machine from a first physical network interface card (pNIC) on the to a second pNIC.

20 Claims, 4 Drawing Sheets

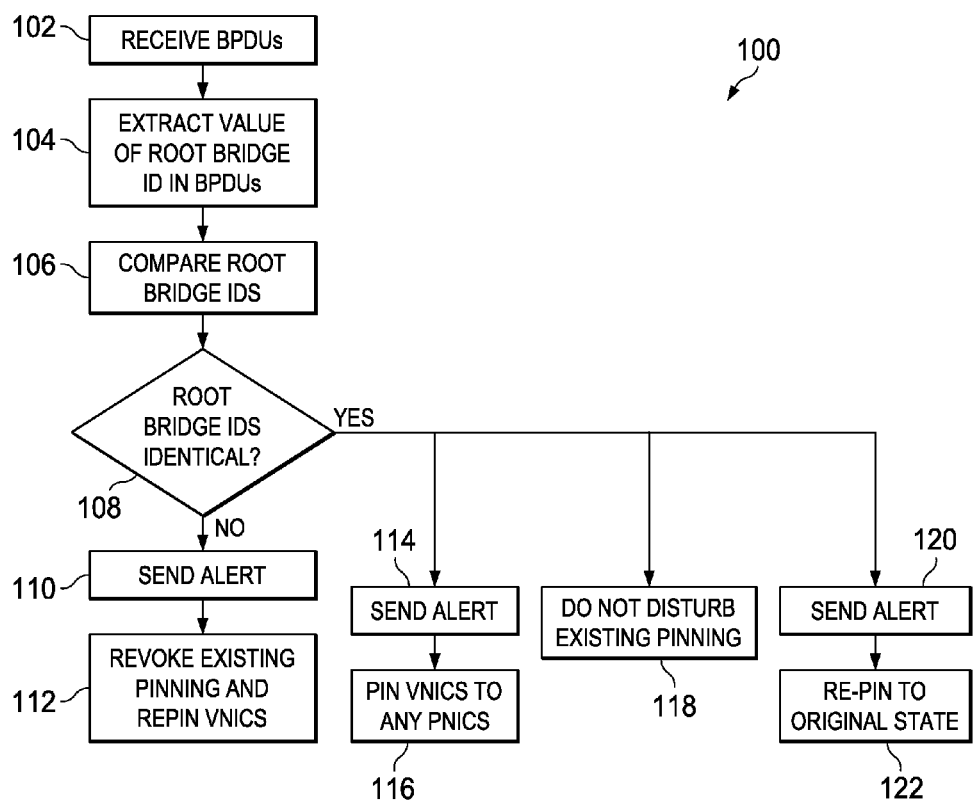

SYSTEM AND METHOD FOR PINNING VIRTUAL MACHINE ADAPTERS TO PHYSICAL ADAPTERS IN A NETWORK ENVIRONMENT

TECHNICAL FIELD

This disclosure relates in general to the field of communications and, more particularly, to a system and a method for pinning virtual machine adapters to physical adapters in a network environment.

BACKGROUND

Data centers are increasingly being used by enterprises for various activities (collaboration, interaction, storage of data and resources, etc.). A typical data center network contains myriad network elements, including servers, load balancers, routers, switches, etc. The network connecting the network elements provides secure user access to data center services and an infrastructure for deployment, interconnection, and aggregation of shared resource as required, including applications, servers, appliances, and storage. Improving operational efficiency and optimizing utilization of resources in data centers are some of the challenges facing data center managers. Data center managers seek a resilient infrastructure that consistently supports diverse applications and services, and that protects the applications and services against disruptions. A properly planned data center network provides application and data integrity, while optimizing the application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified flow diagram illustrating example operations that may be associated with an embodiment of the communication system.

DETAILED DESCRIPTION OF EXAMPLE EMBODIMENTS

Overview

An example method for pinning virtual machine adapters to physical adapters in a network environment is provided and includes capturing, at a server, a first Bridge Protocol Data Unit (BPDU) from a first switch in a virtual local area network (VLAN), and a second BPDU from a second switch in the VLAN. The term 'capture' in this context includes any activity associated with receiving, intercepting, proxying, etc. The method also includes identifying a first root bridge identifier (ID) of a first spanning tree associated with the first BPDU and a second root bridge ID of a second spanning tree associated with the second BPDU. The term 'identifying' in this context includes evaluating, analyzing, or otherwise processing the ID. The method also includes comparing the first root bridge ID and the second root bridge ID, and communicating an alert (which includes any type of signal, packet, notice, etc., all of which can be provided in any suitable format). If the first root bridge ID is different from the second root bridge ID, the alert indicates re-pinning a virtual network interface card associated with a virtual machine on the server from a first physical network interface card (pNIC) on the server, to a second pNIC on the server.

In a specific implementation, if the first root bridge ID is different from the second root bridge ID, the method further includes inferring that at least one of the first switch and the second switch is disconnected from the VLAN, the first pNIC is disconnected from the VLAN, and the second pNIC is not disconnected from the VLAN. In another specific implementation, if the first root bridge ID is identical to the second root bridge ID, the method further includes communicating the alert, where the alert indicates pinning the vNIC to any one of the first pNIC and the second pNIC. In yet another implementation, if the first root bridge ID is identical to the second root bridge ID, the method further includes communicating the alert that indicates reverting the pinning of the vNIC to the first pNIC, and other features.

Example Embodiments

Figure 1:
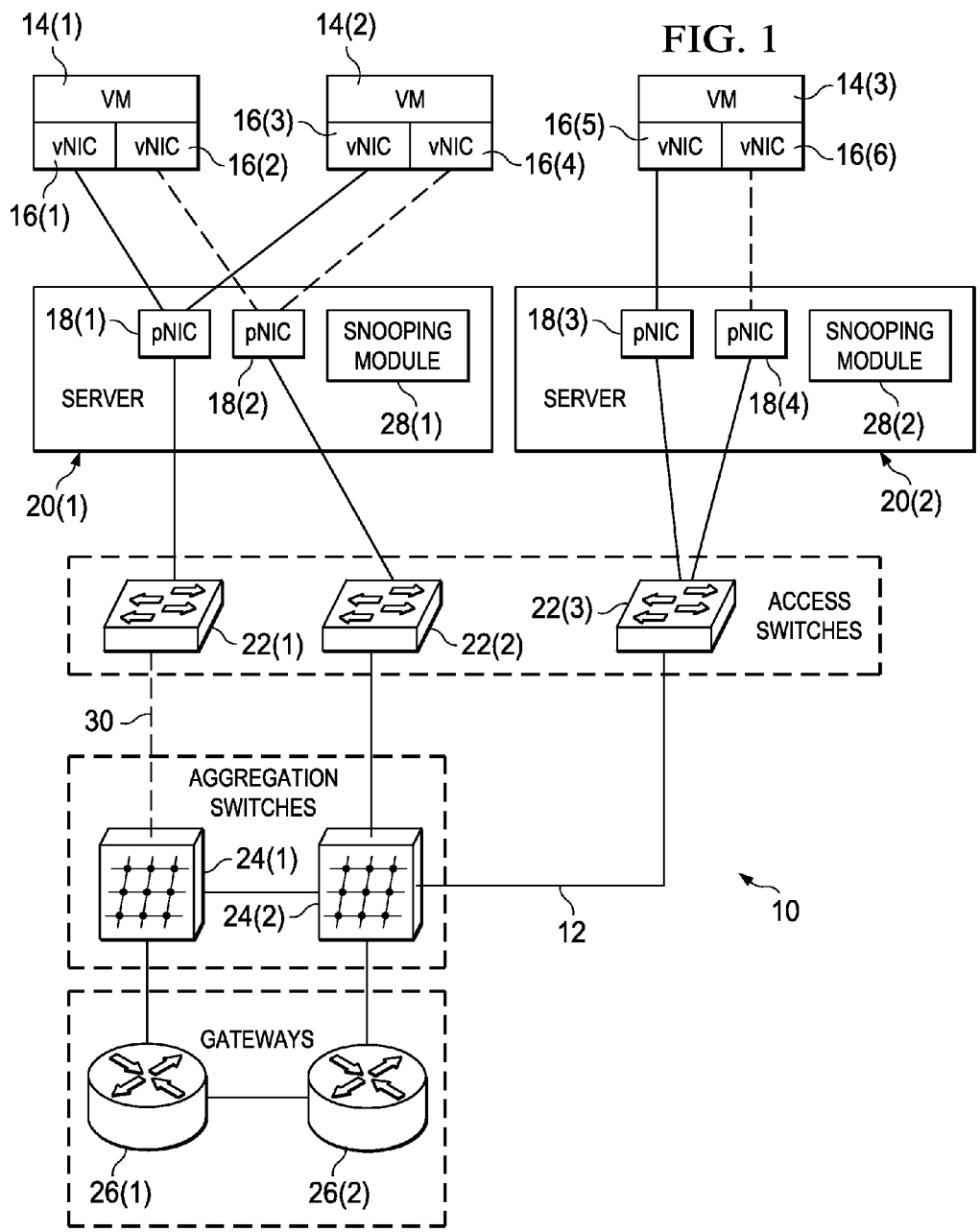
FIG. 1 is a simplified block diagram illustrating a system for pinning virtual machine adapters to physical adapters in a network environment in accordance with one embodiment of the present disclosure.

Turning to FIG. 1, FIG. 1 is a simplified block diagram illustrating a communication system 10 for pinning virtual machine adapters to physical adapters in a network environment in accordance with one embodiment of the present disclosure. Communication system 10 includes a network 12 (generally indicated by an arrow), where several virtual machines (VMs) 14(1)-14(3) may be interconnected. VMs 14(1) may be associated with virtual network interface cards (vNICs) 16(1) and 16(2); likewise, VM 14(2) may be associated with vNICs 16(3) and 16(4); and VM 14(3) may be associated with vNICs 16(5) and 16(6). Each vNIC may be pinned to a respective physical network interface card (pNIC). For example, vNICs 16(1) and 16(3) may be pinned to pNIC 18(1); vNIC 16(2) and 16(4) may be pinned to pNIC 18(2); vNIC 16(5) may be pinned to pNIC 18(3); and vNIC 16(6) may be pinned to pNIC 18(4). pNICs 18(1)-18(4) may be provisioned in servers 20(1) and 20(2) suitably. For example, pNICs 18(1) and 18(2) may be provisioned in server 20(1); and pNICs 18(3) and 18(4) may be provisioned in server 20(2).

Each pNIC may be connected to an access switch. For example, pNIC 18(1) may be connected to access switch 22(1); pNIC 18(2) may be connected to access switch 22(2); pNICs 18(3) and 18(4) may be connected to access switch 22(3). Access switches 22(1)-22(3) may be connected over an aggregation tier comprising a plurality of aggregation switches 24(1)-24(2), which may be connected to network gateways 26(1) and 26(2). Snooping module 24s 28(1) and 28(2) in respective servers 20(1) and 20(2) may provide for intelligently pinning vNICs 16(1)-16(6) to pNICs 18(1)-18(4).

It may be noted that only a few network elements are shown in FIG. 1 for ease of illustration. Any number of VMs, servers, access switches, aggregation switches, gateways, vNICs, pNICs, and other network elements may be provided in network 12 within the broad scope of the embodiments.

Certain terminologies are used with regard to the various embodiments of communication system 10. As used herein, the term "network element" can encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

As used herein, the term "virtual network interface card" includes a virtual network element that emulates a physical network interface card and allows connectivity in a network environment. In particular, the vNIC includes software for creating a network connection between two or more network elements. The vNIC appears to the associated VM as a full-fledged Ethernet controller, complete with its own Media Access Control (MAC) address. As used herein, the term "physical network interface card" includes a network adapter that allows connectivity in the network environment. pNICs can include Peripheral Component Interconnect (PCI) cards, media adapters, integrated wireless adapter chips, and other hardware components. pNICs are used as uplinks by the vNICs to the physical network infrastructure. pNICs and vNICs can transmit and receive data to and from the network at the data link layer of the Open Systems Interconnection (OSI) network model.

As used herein, the term "server" includes a computer configured to process requests and deliver data to other computers over a network. Servers can be inclusive of programs that share resources with one or more client processes. Servers can host one or more VMs and other applications in a network environment. Servers can be physical or virtual.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In current virtual network infrastructure, vNICs, also called virtual adapters, associated with VMs are pinned to pNICs, also called physical adapters, of the server on which the VMs are installed to provide loadbalancing/high-availability. As used herein, the term "pinning" includes mapping, attaching, connecting, joining, assigning, and otherwise associating two nodes (e.g., vNICs with the pNICs) of a network. The pinning process can be statically configured when the vNICs are defined or dynamically pinned by the system in a round-robin manner. For example, assume that 4 pNICs are used by 5 different VMs, each VM having 2 vNICs. The 10 vNICs may be pinned to the 4 pNICs in a round robin manner, based on a virtual port ID, for example. The first vNIC is assigned to pNIC 1, the second vNIC is assigned to pNIC 2, the third vNIC is assigned to pNIC 3, the fourth vNIC is assigned to pNIC 4, the fifth vNIC is assigned to pNIC 1, the sixth vNIC is assigned to pNIC 2, and so on.

As the vNICs are pinned, the assumption is that Layer 2 upstream connectivity for the VMs will be similar on all pNICs connected to multiple access switches. However, the assumption may not be true always. For example, turning to the network topology of FIG. 1, if a link 30 between access switch 22(1) and upstream aggregation switch 24(1) fails (e.g., disconnects), the pinning on server 20(1) may not change with currently existing round-robin pinning methods (e.g., pinning based on vNIC identifiers). As a result, traffic can be blocked from and to the associated pNIC that uses link 30. The vNICs may be re-pinned only when the pNIC is disconnected and may not re-pin if there is a subsequent disconnect at any Layer 2 links. Such disruption in traffic may impact business critical applications within the network (e.g., network 12).

In some networks, network state tracking modules may send broadcast packets to pNICs on a particular VLAN to verify connectivity. If there are no connectivity problems on the particular VLAN, current mechanisms assume that there are no connectivity problems on other VLANs. However, with multiple VLANs, broadcast packets may be sent to all VLANs to ensure than none of the VLANs have any connectivity problems. Such broadcast in large networks can result in inefficient bandwidth usage.

Communication system 10 is configured to address these issues (and others) in offering a system and method for pinning virtual machine adapters to physical adapters in a network environment. Embodiments of communication system 10 can intelligently pin virtual machine adapters to physical adapters on a server, for example, by identifying the state of network 12 before pinning vNICs 16(1)-16(6) to pNICs 18(1)-18(4).

Snooping module 28(1)-28(2) may snoop spanning tree protocol (STP) Bridge Protocol Data Units (BPDUs) for VLANs on server uplink ports. Typical Layer 2 networks, including network 12, may use STP to ensure a loop-free topology. STP creates a spanning tree within a mesh network of connected bridges (e.g., Layer 2 switches), and disables links that are not part of the spanning tree, leaving a single active path between any two network elements. As used herein, the term "spanning tree" includes a connected, undirected graph comprising nodes of the network forming vertices of the graph, and links of the network forming edges, such that a minimal set of edges connects all the vertices. The root bridge of the spanning tree is the bridge with the smallest bridge identifier (ID), comprising a configurable bridge priority number and a MAC address. Each VLAN may have a separate (and unique) root bridge. The bridge priority default is 32768 and can only be configured in multiples of 4096. To compare two bridge IDs, the priority is compared first. If two bridges have equal priority then the MAC addresses are compared; for example, if switches A (MAC=0200.0000.1111) and B (MAC=0200.0000.2222) both have a priority of 32768 then switch A will be selected as the root bridge. Typical spanning trees are computed by estimating the least cost path from any connected network element to the root bridge. An administrator can configure the cost of traversing a particular network segment.

The bridges may determine the root bridge and compute the port roles (e.g., root, designated, or blocked). To ensure that each bridge has enough information, the bridges use data frames called BPDUs to exchange information about bridge IDs and root path costs. The BPDU is sent as a multicast message (e.g., to multicast address 01:80:C2:00:00:00) within a reserved range of MAC addresses (e.g., in a specific VLAN), which are consumed by each bridge and not forwarded. Each bridge periodically advertises its understanding of the network topology and the path cost to the root for each of its ports. For example, a specific bridge sends a BPDU frame using the unique MAC address of the port itself as a source address, and a destination address of the STP multicast address 01:80:C2:00:00:00. A typical BPDU format includes a protocol identifier, root bridge ID, bridge ID, and other parameters. The root bridge ID may be provided as a 2-byte priority number followed by a 6 byte MAC address. BPDUs are exchanged regularly (e.g., every 2 seconds) and enable bridges to keep track of network changes and to start and stop forwarding at ports as required.

For a specific VLAN, the root bridge ID seen by one VM in the VLAN may be the same as the root bridge ID seen by any other VM in the VLAN. A difference in root bridge IDs may indicate a connectivity problem. For example, at time $T_0$, snooping of STP BPDU on uplinks of server 20(1) may indicate the same root bridge ID for BPDUs from access switches 22(1) and 22(2) at snooping module 24 28(1). Assume that at time $T_1$, link 30 between access switch 22(1) and aggregation switch 24(1) fails. BPDUs from access switches 22(1) and 22(2) may subsequently indicate separate root bridge IDs, although both are in the same VLAN. According to various embodiments, access switches 22(1)-22(3) may send out BPDUs through substantially all ports, including ports connected to servers 20(1)-20(2). Snooping module 24 may determine that network connectivity has been disrupted in network 12, and can notify a network administrator, or syslog server, so that vNICs 16(1)-16(6) can be re-pinned suitably.

Embodiments of communication system can have several advantages. For example, mechanisms for detecting an upstream connection outage using BPDUs with auto re-pinning of vNICs 16(1)-16(6) may be provided by embodiments of communication system 10. A passive algorithm may be provided that may not have servers 20(1)-20(2) send beacons, for example. In another example, pinning according to the embodiments of communication system 10 can provide a mechanism to re-pin when upstream connectivity changes, unlike pinning using round-robin. Pinning using round-robin may not guarantee that the network is intact. It is not an intelligent pinning mechanism in identifying connectivity issues.

Moreover, auto-pinning of vNICs 16(1)-16(4) can help to obtain substantially continuous (e.g., 24/7) connectivity. Embodiments of communication system 10 can facilitate identifying disjoints in Layer 2 across multiple physical switches connected via server uplink ports. Notification of breaks in the links (e.g., link 30) can be notified to physical switches or network administrators using suitable protocols. Troubleshooting in large networks can be easier with mechanisms provided by embodiments of communication system 10.

Turning to the infrastructure of communication system 10, the network topology can include any number of servers, virtual machines, switches, routers, and other nodes interconnected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, a plurality of switches (virtual and/or physical) may be provided at each network level to achieve redundancy within network 12.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, snooping module 24s 28(1) and 28(2) may include applications and hardware that operate together to perform the operations described herein. For example, a portion of snooping module 24s 28(1) and 28(2) may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules. In some embodiments, snooping module 24s 28(1) and 28(2) may interface with the hardware components of respective servers 20(1) and 20(2) to perform the operations described herein.

Access switches 22(1)-22(3) may be inclusive of routers, switches and such other network elements with packet routing, bridging, and switching functionalities that are directly attached to one or more servers. Access switches 22(1)-22(3) may be provisioned in an access/aggregation tier network topology. Access switches 22(1)-22(3) may include leaf switches in a leaf/spine network topology. Aggregation switches 24(1)-24(2) may be inclusive of routers, switches and such other network elements with packet routing, bridging, and switching functionalities that connect one or more access switches 22(1)-22(3). Gateways 26(1) and 26(2) may be inclusive of routers, switches and such other network elements with packet routing, bridging, and switching functionalities that connect network 12 to other networks (e.g., Internet).

Figure 2:
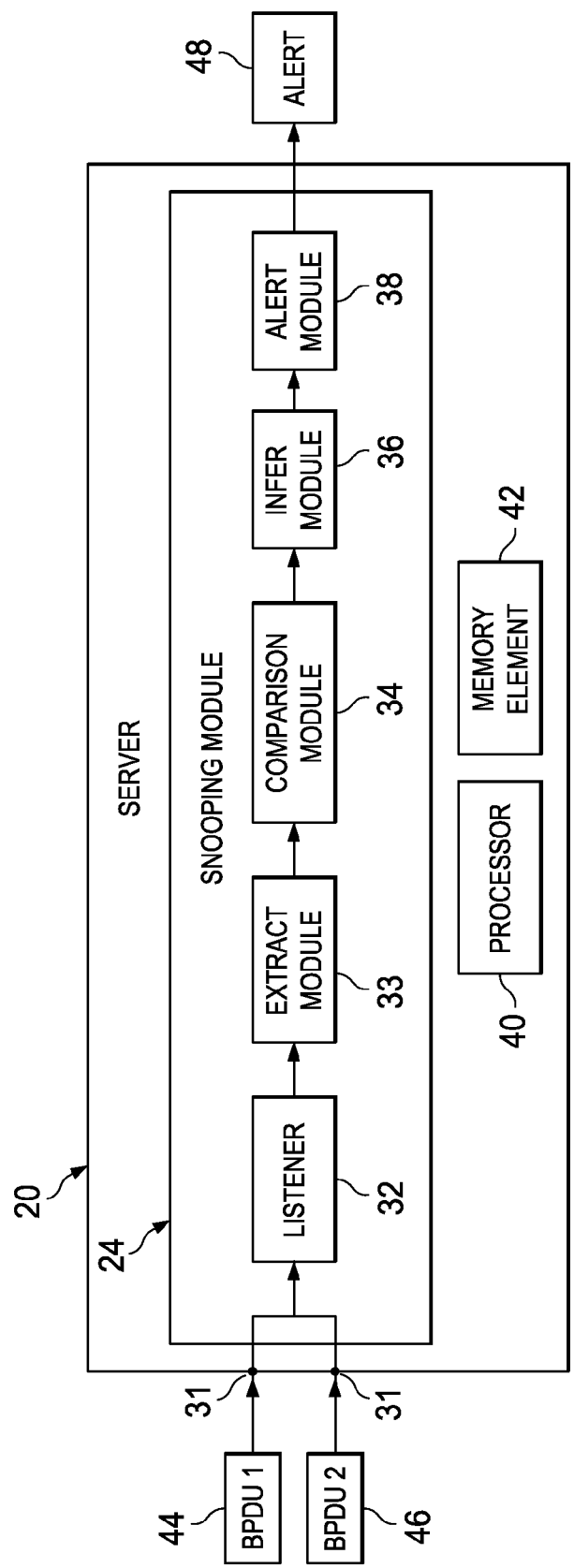
FIG. 2 is a simplified block diagram illustrating example details of the communication system in accordance with one embodiment of the present disclosure.

Turning to FIG. 2, FIG. 2 is a simplified block diagram illustrating example details of communication system 10. Representative server 20 may include representative snooping module 24. In various embodiments, snooping module 24 may be attached to substantially all ports 31 on server 20. Snooping module 24 may include a listener 32 that can listen to multicast messages at ports 31, an extract module 33, a comparison module 34, an infer module 36, and an alert module 38. In some embodiments, snooping module 24 may use a processor 40 and a memory element 42 of server 16 for performing the operations described herein. In other embodiments, processor 40 and memory element 42 may be a part of snooping module 24, for example, integrated into a single component, such as an Application Specific Integrated Circuit (ASIC).

In operation, snooping module 24 may make a request to join a multicast stream for the BPDUs in some embodiments. In other embodiments, snooping module 24 may passively listen to and detect BPDUs in the network as appropriate. For example, listener 32 may listen to BPDUs in network 12. A BPDU 44 (e.g., BPDU 1) from access switch 22(1) and another BPDU 46 (e.g., BPDU 2) from access switch 22(2) may be received and examined by extract module 33. Extract module 33 may extract the values of root bridge ID fields from BPDUs 44 and 46. Comparison module 34 may compare the root bridge ID fields to determine if they are identical. [Note that the term 'identical' as used herein includes any percentage of threshold similarity, as predefined in communication system 10, provisioned through settings, designated by an administrator, etc. Hence, 'identical' is not necessarily a perfect one-to-one identity between two objects.] If they are identical, infer module 36 may infer that there are no connectivity problems in network 12. The vNICs of associated VMs may be pinned to any suitable pNIC (e.g., using round-robin or other mechanisms).

If the root bridge IDs in BPDUs 44 and 46 are not identical, a connectivity problem may be indicated. Alert module 38 may send an alert 48 to a network administrator, or syslog server, or other suitable recipient. As used herein, the term "alert" can include a message (e.g., text notification, sound notification, e-mail, voice message, etc.) and/or a report (e.g., logs, reports, etc.). Alert 48 may trigger a pinning or re-pinning process, wherein existing pinning may be revoked, and the vNICs may be re-pinned to suitable pNICs that are not disconnected from the network. In some embodiments, the re-pinning process may be automatic.

In some embodiments, ports 31 on server 20 on which BPDUs 44 and 46 are received may be part of PortChannels (e.g., aggregated links) configured on server 20. In other embodiments, ports 31 on server 20 may not be part of PortChannels. In some embodiments where ports 31 are part of PortChannels or Etherchannels or other such link-aggregation mechanisms, BPDUs may be received on substantially all links in the aggregated links; substantially all BPDUs may be examined and compared to determine any discrepancies in the respective root bridge IDs. In various embodiments, ports 31 may be server uplink ports that connect to access switches and configured to receive BPDUs without being disconnected from the network, or being placed in an error-disabled state, or otherwise rendered inoperable.

It may be noted that only two ports 31 and two BPDUs 46 and 48 are shown in FIG. 1 for ease of illustration. Any number of BPDUs may be received at server 20 and any number of ports may be suitably configured in server 20 within the broad scope of the embodiments. In a general sense, comparisons of root bridge IDs may be implemented in pairs (e.g., root bridge IDs of two BPDUs may be compared at a time), although comparisons in multiples (>2) may also be performed without departing from the scope of the present disclosure.

Figure 3:
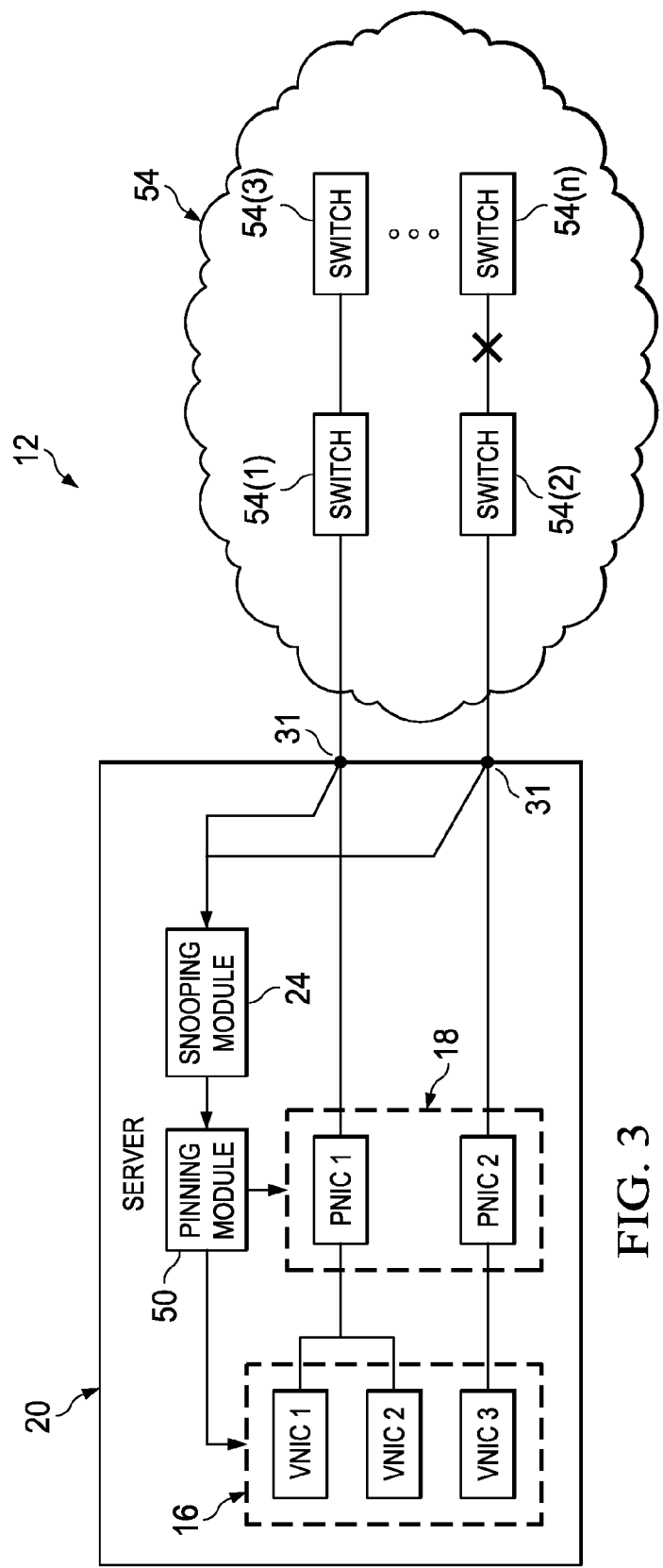
FIG. 3 is a simplified block diagram illustrating further example details of the communication system in accordance with one embodiment of the present disclosure.

Turning to FIG. 3, FIG. 3 is a simplified block diagram illustrating example details of communication system 10. Representative server 20 may include snooping module 24, ports 31, one or more pNICs (collectively referred to herein as pNICs 18) (e.g., pNIC 1, pNIC 2), one or more vNICs (collectively referred to herein as vNICs 16) (e.g., vNIC 1, vNIC 2, vNIC 3) and a pinning module 50. vNICs 16 may be pinned to pNICs 18. For example, vNIC 1 and vNIC 2 may be pinned to pNIC 1; vNIC 3 may be pinned to pNIC 20. The pinning may be implemented by pinning module 50. For example, to start with, vNICs 16 may be pinned to pNICs 18 in a round-robin manner. Ports 31 may be associated with pNICs 18. In some embodiments, each pNIC may be associated with a unique port.

Ports 31 may be connected to switches collectively referred to herein as switches 54. For example, switches 54 may include switches 54(1)-54(n), interconnected to form a large and complex network 12. Assume, for purposes of illustration only, and not as a limitation, that the network elements shown in the FIGURE are associated with a common VLAN. Switches 54 may communicate BPDUs among themselves as part of their normal operations. Ports 31 may be configured to listen to and capture BPDUs traversing network 12.

Snooping module 24 may determine whether any connectivity problems exist in network 12 by examining and comparing the root bridge IDs of captured BPDUs. For example, a link between switch 54(2) and 54(n) may have failed. Consequently, pNIC 2 may be disconnected from network 12. Snooping module 24 may send alerts to pinning module 50, which may revoke the existing pinning of vNIC 3 to pNIC 2. vNIC 3 may be re-pinned to pNIC 1, which may not have suffered any connectivity loss. Traffic from VMs attached to vNIC 3 may be communicated without any blocks, outages, or other connectivity problems.

The re-pinning may be based on network connectivity parameters, and thus may not be implemented through round-robin or other such mechanisms. In some embodiments, only the affected vNICs may be re-pinned. In other embodiments, substantially all vNICs may be re-pinned, for example, to achieve appropriate loadbalancing. When the network connectivity is restored, snooping module 24 may determine the resolution by examining and comparing root bridge IDs of BPDUs, as before. Alerts may be sent to pinning module 50, which may restore the original pinning, for example, revoking pinning of vNIC 3 to pNIC 1 and re-pinning vNIC 3 to pNIC 2.

Turning to FIG. 4, FIG. 4 is a simplified flow diagram illustrating example operations that may be associated with embodiments of communication system 10. Operations 100 may include 102, at which BPDUs 46 and 48 may be received at server ports 31 on server 20. At 104, extract module 33 may extract values of root bridge IDs in BPDUs 46 and 48. At 106, the root bridge IDs may be compared. At 108, a determination may be made whether the root bridge IDs are identical. If they are not identical, alert 48 may be sent at 110 to a suitable recipient. At 112, existing pinning may be revoked and the vNICs may be re-pinned to suitable pNICs that are not disconnected from the network.

Turning back to 108, if the root bridge IDs are identical, alert 48 may be sent at 114, indicating the same The vNICs may be pinned to any pNICs as desired (e.g., using round-robin, or other suitable mechanisms) at 116. Alternately, any existing pinning may be not be disturbed at 118. Alternately, an alert may be sent at 120 indicating that the root bridge IDs are identical. The vNICs may be re-pinned to their original pinning state at 122 (e.g., if vNICs have been re-pinned at 112).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, snooping module 24. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 42) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification.

In one example, processors (e.g., processor 40) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 42) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a processor associated with a server in a network environment, comprising:
  capturing a first Bridge Protocol Data Unit (BPDU) from a first switch in a virtual local area network (VLAN), and a second BPDU from a second switch in the VLAN;

identifying a first root bridge identifier (ID) of a first spanning tree associated with the first BPDU and a second root bridge ID of a second spanning tree associated with the second BPDU;
comparing the first root bridge ID and the second root bridge ID; and
communicating an alert, wherein if the first root bridge ID is different from the second root bridge ID, the alert indicates pinning a virtual network interface card (vNIC) associated with a virtual machine (VM) on a server from a first physical network interface card (pNIC) on the server, to a second pNIC.

2. The method of claim 1, wherein the pinning between the vNIC and the second vNIC is based on connectivity of the first pNIC and the second pNIC to the VLAN.

3. The method of claim 1, wherein if the first root bridge ID is different from the second root bridge ID, the method further comprises:
inferring that at least one of the first switch and the second switch is disconnected from the VLAN, and wherein the first pNIC is disconnected from the VLAN and the second pNIC is not disconnected from the VLAN.

4. The method of claim 1, wherein the alert is not communicated if the first root bridge ID is identical to the second root bridge ID.

5. The method of claim 1, further comprising:
communicating the alert if the first root bridge ID is identical to the second root bridge ID, wherein the alert indicates pinning the vNIC to any one of the first pNIC and the second pNIC.

6. The method of claim 1, further comprising:
communicating the alert if the first root bridge ID is identical to the second root bridge ID, wherein the alert indicates reverting the pinning of the vNIC to the first pNIC.

7. The method of claim 1, wherein the first switch and the second switch are access switches in an access/aggregation tier network topology.

8. The method of claim 1, wherein the first switch and the second switch are leaf switches in a leaf/spine network topology.

9. The method of claim 1, wherein the first BPDU is received over a first PortChannel link and the second BPDU is received over a second PortChannel link.

10. The method of claim 1, wherein the first BPDU and the second BPDU are received at uplink ports on the server.

11. Logic encoded in non-transitory computer readable media that includes instructions for execution and when executed by a processor, is operable to perform operations comprising:
capturing a first BPDU from a first switch in a VLAN, and a second BPDU from a second switch in the VLAN;
identifying a first root bridge ID of a first spanning tree associated with the first BPDU and a second root bridge ID of a second spanning tree associated with the second BPDU;
comparing the first root bridge ID and the second root bridge ID; and
communicating an alert, wherein if the first root bridge ID is different from the second root bridge ID, the alert indicates pinning a vNIC associated with a VM on a server from a first pNIC on the server, to a second pNIC.

12. The logic of claim 11, the operations further comprising, if the first root bridge ID is different from the second root bridge ID, inferring that at least one of the first switch and the second switch is disconnected from the VLAN, and wherein the first pNIC is disconnected from the VLAN and the second pNIC is not disconnected from the VLAN.

13. The logic of claim 11, wherein the alert is not communicated if the first root bridge ID is identical to the second root bridge ID.

14. The logic of claim 11, the operations further comprising:
communicating the alert if the first root bridge ID is identical to the second root bridge ID, wherein the alert indicates pinning the vNIC to any one of the first pNIC and the second pNIC.

15. The logic of claim 11, the operations further comprising:
communicating the alert if the first root bridge ID is identical to the second root bridge ID, wherein the alert indicates reverting the pinning of the vNIC to the first pNIC.

16. An apparatus, comprising:
a snooping module;
a memory element for storing data; and
a processor operable to execute instructions associated with the data, wherein the snooping module, the processor, and the memory element cooperate such that the apparatus is configured for:
capturing a first BPDU from a first switch in a VLAN, and a second BPDU from a second switch in the VLAN;
identifying a first root bridge ID of a first spanning tree associated with the first BPDU and a second root bridge ID of a second spanning tree associated with the second BPDU;
comparing the first root bridge ID and the second root bridge ID; and
communicating an alert, wherein if the first root bridge ID is different from the second root bridge ID, the alert indicates re-pinning a vNIC associated with a VM from a first pNIC on the apparatus, to a second pNIC.

17. The apparatus of claim 16, further configured for:
inferring that, if the first root bridge ID is different from the second root bridge ID, at least one of the first switch and the second switch is disconnected from the VLAN, and wherein the first pNIC is disconnected from the VLAN and the second pNIC is not disconnected from the VLAN.

18. The apparatus of claim 16, wherein the alert is not communicated if the first root bridge ID is identical to the second root bridge ID.

19. The apparatus of claim 16, further configured for:
communicating the alert if the first root bridge ID is identical to the second root bridge ID, wherein the alert indicates pinning the vNIC to any one of the first pNIC and the second pNIC.

20. The apparatus of claim 16, further configured for:
communicating the alert if the first root bridge ID is identical to the second root bridge ID, wherein the alert indicates reverting the pinning of the vNIC to the first pNIC.

* * * * *